(12) United States Patent
Kim et al.

(10) Patent No.: US 7,770,323 B2
(45) Date of Patent: Aug. 10, 2010

(54) PREFABRICATION TYPE FLOWERPOT BLOCK

(76) Inventors: Jung-Hoi Kim, Hwajeon 2-Dong, Deokyang-Gu, 1406-703, Okvit Maeul 14-Danji, Goyang Si Gyeonggi-Do (KR) 412-745; Youn-Ja Jen, Samseong-Dong, Gangnam-Gu, 102-506, Hansol Apt, #5, Seoul (KR) 135-863

( * ) Notice: Subject to any disclaimer, the term of this patent is extended or adjusted under 35 U.S.C. 154(b) by 113 days.

(21) Appl. No.: 12/295,691

(22) PCT Filed: Apr. 10, 2007

(86) PCT No.: PCT/KR2007/001723
§ 371 (c)(1),
(2), (4) Date: Oct. 1, 2008

(87) PCT Pub. No.: WO2007/117105
PCT Pub. Date: Oct. 18, 2007

(65) Prior Publication Data
US 2009/0183429 A1    Jul. 23, 2009

(30) Foreign Application Priority Data
Apr. 10, 2006  (KR) .................. 10-2006-0032273
Dec. 6, 2006   (KR) .................. 10-2006-0123420

(51) Int. Cl.
*A01G 9/02*   (2006.01)
(52) U.S. Cl. ........................................... 47/66.3
(58) Field of Classification Search .............. 47/66.1, 47/66.3, 73, 76, 77, 79, 86
See application file for complete search history.

(56) References Cited

U.S. PATENT DOCUMENTS 160,088 A * 2/1875 Eby .............................. 47/73

(Continued)

FOREIGN PATENT DOCUMENTS

KR    100191651    1/1999

(Continued)

*Primary Examiner*—Francis T Palo
(74) *Attorney, Agent, or Firm*—Park & Associates IP Law LLC

(57) ABSTRACT

Disclosed is a prefabricated type flowerpot block. It can be assembled in a simple manner, it can perform root-balling for a predetermined period and it can allow a plant to be transplanted to thus be conveniently moved. Accordingly, it eliminates the trouble of planting a plant to be transplanted in the ground during a transplanting process, and thus it prevents the roots of a plant to be transplanted from being damaged while the plant is moved to a transplanting place. The prefabricated type flowerpot block can also function as a flowerpot to plant therein any size of plant. In order to achieve the advantages as described above, the prefabricated type flowerpot block includes: four block bodies (10), each having an assembly protrusion (14) at a first end, an assembly depression (12) at a second end which is opposite the first end so that the assembly protrusion of another block body can be inserted into the assembly depression, a water supply hole (22) formed in an upper portion so that water can be introduced into a water tank (20) provided at an upper part thereof, and a plurality of water discharge holes (24) formed in an inner surface thereof; and a fixing unit (30, 30*a*, 30*b*) which is inserted into a coupling hole (16) provided in the assembly protrusion (14) and the assembly depression (12) of the block body so that the block bodies are securely coupled after the block bodies are assembled.

6 Claims, 14 Drawing Sheets

U.S. PATENT DOCUMENTS

| | | | |
|---|---|---|---|
| 172,616 A * | 1/1876 | Eby | 47/73 |
| 1,317,569 A * | 9/1919 | Forester | 47/79 |
| 1,952,597 A * | 3/1934 | Lizzola | 47/79 |
| 2,499,885 A * | 3/1950 | Sommer | 47/79 |
| 4,325,202 A | 4/1982 | Liard | |
| 4,363,189 A * | 12/1982 | O'Donnell, III | 47/73 |
| 4,593,490 A * | 6/1986 | Bodine | 47/79 |
| 4,716,680 A * | 1/1988 | Whitcomb et al. | 47/73 |
| 5,446,994 A * | 9/1995 | Chou | 47/81 |
| 6,038,814 A | 3/2000 | Miotto | |
| 6,691,460 B1 * | 2/2004 | Lee | 47/79 |
| 2009/0183429 A1 * | 7/2009 | Kim et al. | 47/66.1 |

FOREIGN PATENT DOCUMENTS

KR    1020010025721    4/2001

\* cited by examiner

PREFABRICATION TYPE FLOWERPOT BLOCK

TECHNICAL FIELD

The present invention relates to a prefabricated type flowerpot block which functions as a transplanting pot as well as a normal plant pot, and more particularly to a prefabricated type flowerpot which is easily assembled in order to realize convenient transplanting of a plant such as a tree or a flower without causing damage to the roots of the plant, so that it is possible to perform root-balling without planting a plant in the ground soil and then replanting it at the transplanting place. That is, the prefabricated type flowerpot block can eliminate the trouble of planting a plant in ground soil and picking up the plant from the ground soil during a plant transporting process and the risk of damaging the roots of the plant, and the prefabricated type flowerpot block can also serve as a normal flower pot for planting a variety of plants therein without limitation on the size of the plants.

BACKGROUND ART

As city life becomes more widespread, the chances of being in contact with soil decrease, and gardening or growing plants such as trees or flowers becomes difficult. Further, for people who live in apartments, it is even more difficult to have a vegetable patch or a garden. Accordingly, in such case, people must satisfy themselves by planting using flowerpots.

For a variety of purposes such as environmental enhancement and noise insulation, it is common for plants such as trees to be planted in gardens or along sidewalks. In this instance, plants dug up in natural areas, such as mountains or plantation farms, are root-balled by being planted in a predetermined place for a predetermined period before they are transplanted in a transplanting site in order to help the roots of the plants grow to form a rhizosphere so that they can live by themselves after they are transplanted.

That is, most plants dug up in natural areas are not planted right after they are dug up, but root-balling is performed for a year or more in the state in which the plants are planted in a predetermined place. The roots of the plants which are dug up are surrounded by soil and can grow again naturally in such a place. After a predetermined period, such as a year or more, has passed, the plants must be dug up again to be transplanted in a transplanting site. During this process, the roots of the plants are likely to be damaged.

Accordingly, there are troubles and difficulties in maintaining the roots of the plants healthy, even if workers are highly skilled, while the plants are moved and transplanted after performing root-balling for a predetermined period. Further, in the winter season, it is even more difficult to collect the plants in frozen ground and there is a great risk of damaging the roots of the plants while the plants are dug up. However, in spite of such risk and difficulty, such a transplanting process, in which plants are dug up from natural areas, are root-balled for a predetermined period by being planted in a different place, and are then moved and transplanted to a final transplanting site, was common because there was no other alternative. Accordingly, even if workers are highly skilled, there are troubles and difficulties of digging up plants, replanting the plants in a root-balling site, digging up the plants again without causing damage to the roots of the plants, and replanting the plants in a transplanting site.

DISCLOSURE OF INVENTION

Technical Problem

Accordingly, the present invention has been devised in consideration of the aforementioned problems and conditions, and it is a feature of the present invention to provide a prefabricated type flowerpot block which is capable of being assembled in a simple and easy manner to receive the roots of a plant which is dug up without causing damage to the roots, safely moving the plant, eliminating trouble when re-planting the plant, which is dug up in the ground during a root-balling period and digging up the plant again, eliminating the risk of damaging the roots of the plant while the plant is dug up again after the root-balling period, and simplifying a transplanting process, thus protecting the plant to be transplanted.

It is another feature of the present invention to provide a prefabricated type flowerpot block which is capable of managing a plant to be transported merely by placing the plant on the ground instead of planting it in the ground, and safely moving the plant without causing damage to the roots of the plant, which are grown during a root-balling period, which is convenient to use, and which has a function of maintaining the plant in a healthy state and of being scalable to function as a flowerpot to receive any plant without limitation as to the size of the plants therein by changing the way it is assembled.

It is a further feature of the present invention to provide a prefabricated type flowerpot block which is capable of providing space thanks to a plurality of block bodies which can be assembled or integrated into a single body to receive a plant therein and allowing an advertising material or a promotional material to be detachably attached to a front side block body thereof in the form of a frame. Accordingly, the prefabricated type flowerpot block serves to perform an advertising function as wall as a flowerpot function. The advertising material is realized as a lighting frame which displays a variety colors using little power, and can be custom-made when needed at the site in order to improve the functions and designs of the prefabricated type flowerpot block.

Technical Solution

In order to solve the various problems encountered in the conventional art, and in order to achieve the above described advantageous effects and features, in accordance with the present invention, there is provided a prefabricated type flowerpot block, comprising: four block bodies, serving as four sides of the prefabricated type flowerpot block, each having an assembly protrusion at a first end, an assembly depression at a second end, which is opposite the first end so that the assembly protrusion of the other block body can be inserted into the assembly depression, a water supply hole 22 formed in an upper portion so that water can be introduced into a water tank provided in an upper part thereof, and a plurality of water discharge holes formed at an inner surface thereof; and a fixing unit which is inserted into a coupling hole provided in the assembly protrusion and the assembly depression of the block body so that the block bodies are securely coupled after the block bodies are assembled. The block body may have a support protrusion protruding in a horizontal direction from an inner surface thereof below the water discharge holes, and a base plate is disposed on the support protrusion so that the prefabricated type flowerpot block can function as a flowerpot.

The block body may have a rectangular panel shape or a curved shape, so that they can form a box shape or a cylinder shape when the block bodies are assembled to receive a plant therein, and a pattern plate can be attached on the outer surface thereof, which is opposite the surface on which the water discharge holes are provided. The block body may have an auxiliary body having insertion holes, so that the legs of a forklift truck can be inserted into the insertion holes when the prefabricated type flowerpot block is moved by a forklift truck, in which the auxiliary body is integrated into the block body below the water discharge holes. The block body may have wheels so that the prefabricated type flowerpot block can be moved on the ground, wherein each wheel is rotatably coupled to a roller bracket which is connected to a lower end portion of the fixing unit via a connection bar which is joined with the lower end portion of the fixing unit in an insertion joint manner. The block body may have a support plate which is rough on a bottom surface thereof so that the inclination degree of the block body can be adjusted and can be fixed on the ground, wherein a rotating body is provided on a center portion of the support plate, and the rotating body is rotatably connected to a lower end portion of the fixing unit via a connection bar in a screwed manner.

According to another aspect of the present invention, there is provided a prefabricated type flowerpot block having an advertisement function, comprising four block bodies, serving as four sides to make a block and having an open upper end so that a plant or other object can be inserted in the block, and a base plate, provided at the lower end of the four block bodies, wherein the four block bodies can be integrated into a single body or assembled in separated form, wherein a front side block body of the block bodies has a frame insertion portion so that a lighting frame, in which advertising material is lighted by a light-emitting element provided in the lighting frame, is inserted and placed in the frame insertion portion.

The front side block body may have a separation prevention bar integrated thereinto, for preventing the lighting frame, inserted in the frame insertion portion, from being separated, the separation prevention bar may have insertion jointing ends at respective end portions thereof so that they can be detachably fixed into depressions formed in respective side edge portions of the frame insertion portion in an insertion joint manner, or the lighting frame may be fixed using another coupling means. In the case in which the block bodies are in a separated form and are coupled to make a block, an assembly protrusion disposed at a first end of the block body and an assembly depression disposed at a second end of the block body are joined in an insertion joint manner, and the jointing is secured by a fixing unit, in which case the block, which is an assembled form of the block bodies, is a box shape or a cylinder shape.

Advantageous Effects

According to the present invention, the prefabricated type block body can be assembled in a simple and easy manner with respect to a plant such as a tree or a flower to be transplanted, can conveniently move the plant to be transplanted without causing damage to the roots of the plant, and can be transplanted at a transplanting site without having to be planted in the ground for a root-balling period. Accordingly, it is possible to eliminate the trouble of planting the plant in the ground during a root-balling period and digging up the plant from the ground after the root-balling period during a transplanting process. As a result, the roots of the plant can also be prevented from being damaged.

According to the conventional transplanting process, the soil around the plant bulges, so that the soil is washed out by rain or irrigation water. However, according to the present invention, there is no risk of washing out soil from around the roots of the plant, and the plant provided in the prefabricated type flowerpot block according to the present invention is regularly supplied with water stored in the water tank embedded in the prefabricated type flowerpot body. Accordingly, the plant can be safely and securely protected.

The prefabricated type flowerpot block can serve as a flowerpot that can hold any size of plant. Accordingly, it is expected that the prefabricated type flowerpot block can serve as a creative flowerpot block based on a new concept, which can provide advantages such that it can help transplant plants without limitation as to the condition of ground, even under bad conditions, can protect plants, and can keep plants healthy.

The prefabricated type flowerpot block has an advertisement function as well as a flowerpot function because it is capable of providing space on a plurality of block bodies which can be assembled or integrated into a single body to receive a plant therein and allowing advertising material or promotional material to be detachably attached on a front side block body thereof in the form of a frame. The advertising material is realized as a lighting frame which displays a variety of colors with small power. As a result, the function and designs thereof can be improved. Accordingly, the prefabricated type flowerpot block has a flowerpot function which is capable of improving the appearance of a city or an indoor space, and also as an attractive advertising medium.

Further, if the prefabricated type flowerpot block is modified to be shrunk in size, the prefabricated type flowerpot block can serve as a small article block which can receive small articles instead of plants. Further, the prefabricated type flowerpot block can be used as a decorative article with a plant planted in the prefabricated type flowerpot block and the lighting frame attached on the front of the prefabricated type flowerpot block.

BEST MODE FOR CARRYING OUT THE INVENTION

Figure 1:
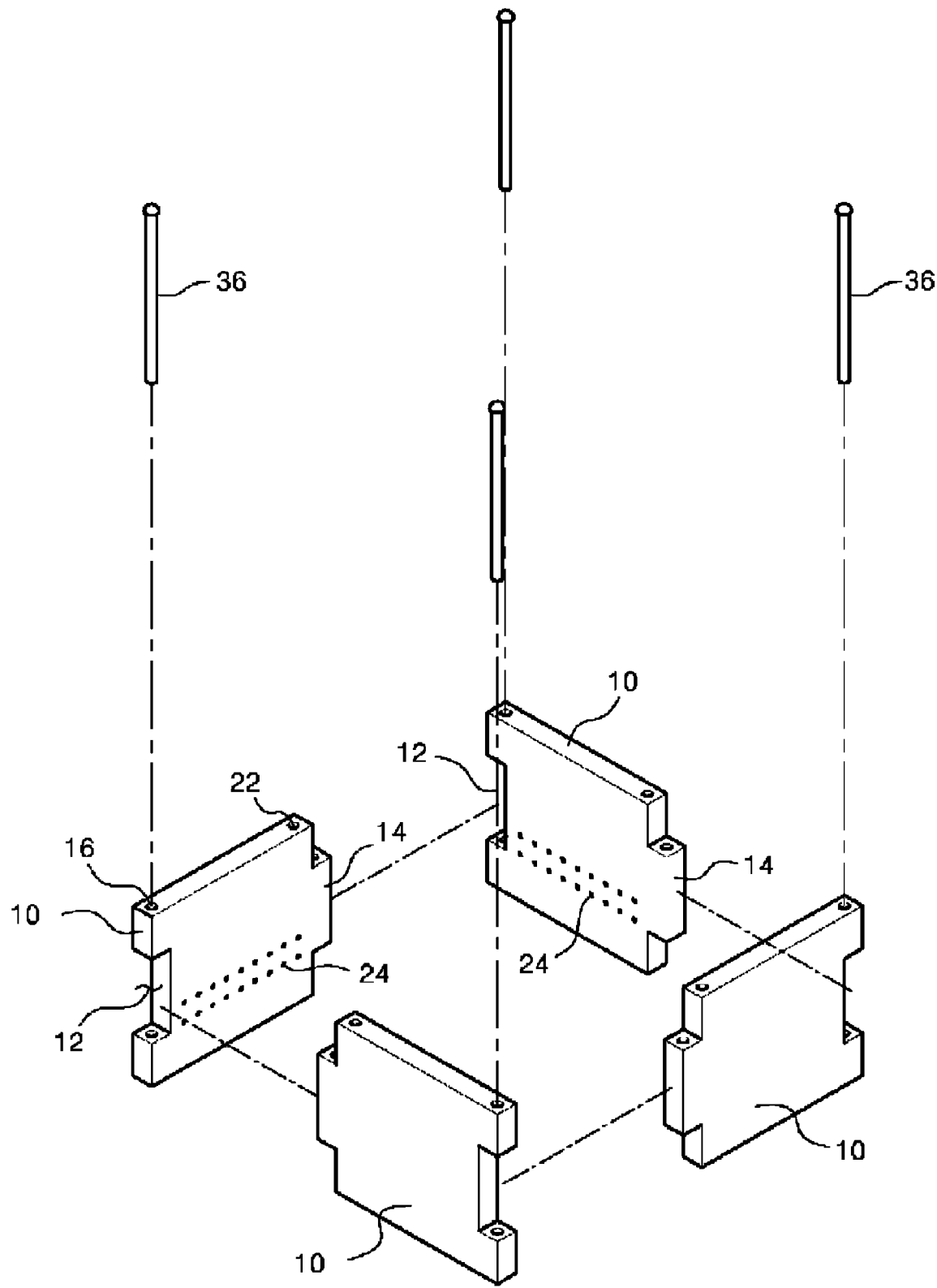
FIG. 1 is a view illustrating a prefabricated type flowerpot block which is in an unassembled state, according to the preferred embodiment of the present invention.

FIG. 1 is a view illustrating a prefabricated type flowerpot block for transplanting, according to a basic embodiment of the present invention. The prefabricated type flowerpot block comprises: a block body 10 having four sides, an assembly protrusion 14 at an end thereof, an assembly depression 12 at the opposite end thereof, a water supply hole 12 at an upper end thereof, in which water flows into a water tank 20 through the water supply hole 12, a plurality of water discharge holes 24 formed in the side surface thereof, which face the opposite block body, and coupling holes 16 formed at the assembly depression 12 and the assembly protrusion 14; and a fixing unit 36 (36a and 36b) inserted into the coupling holes 16 formed in the assembly depressions 12 and the assembly protrusions 14 for coupling and fixing the block body 10.

Figure 9:
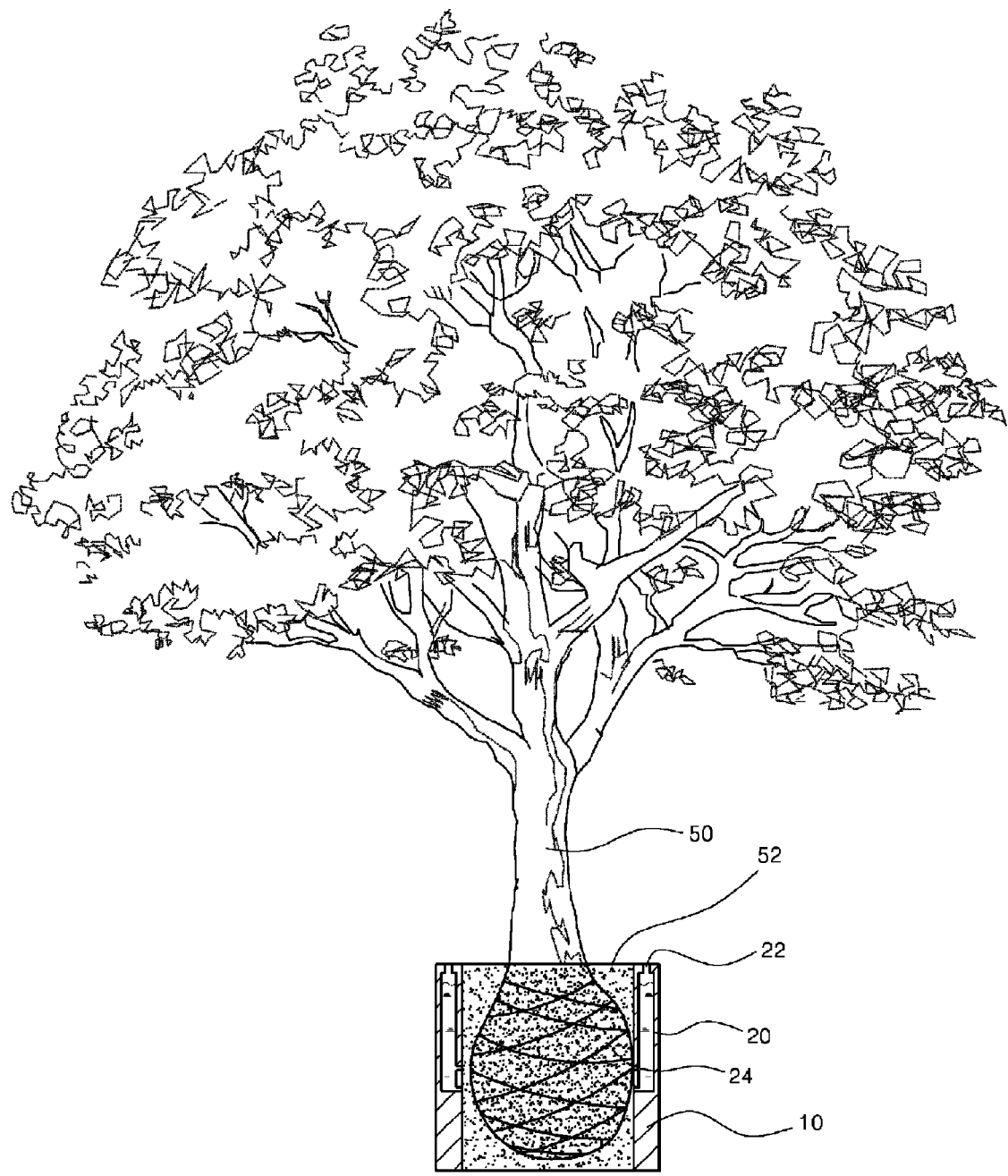
FIG. 9 is a sectional view illustrating the prefabricated type flowerpot block with a plant planted therein.
Figure 10:
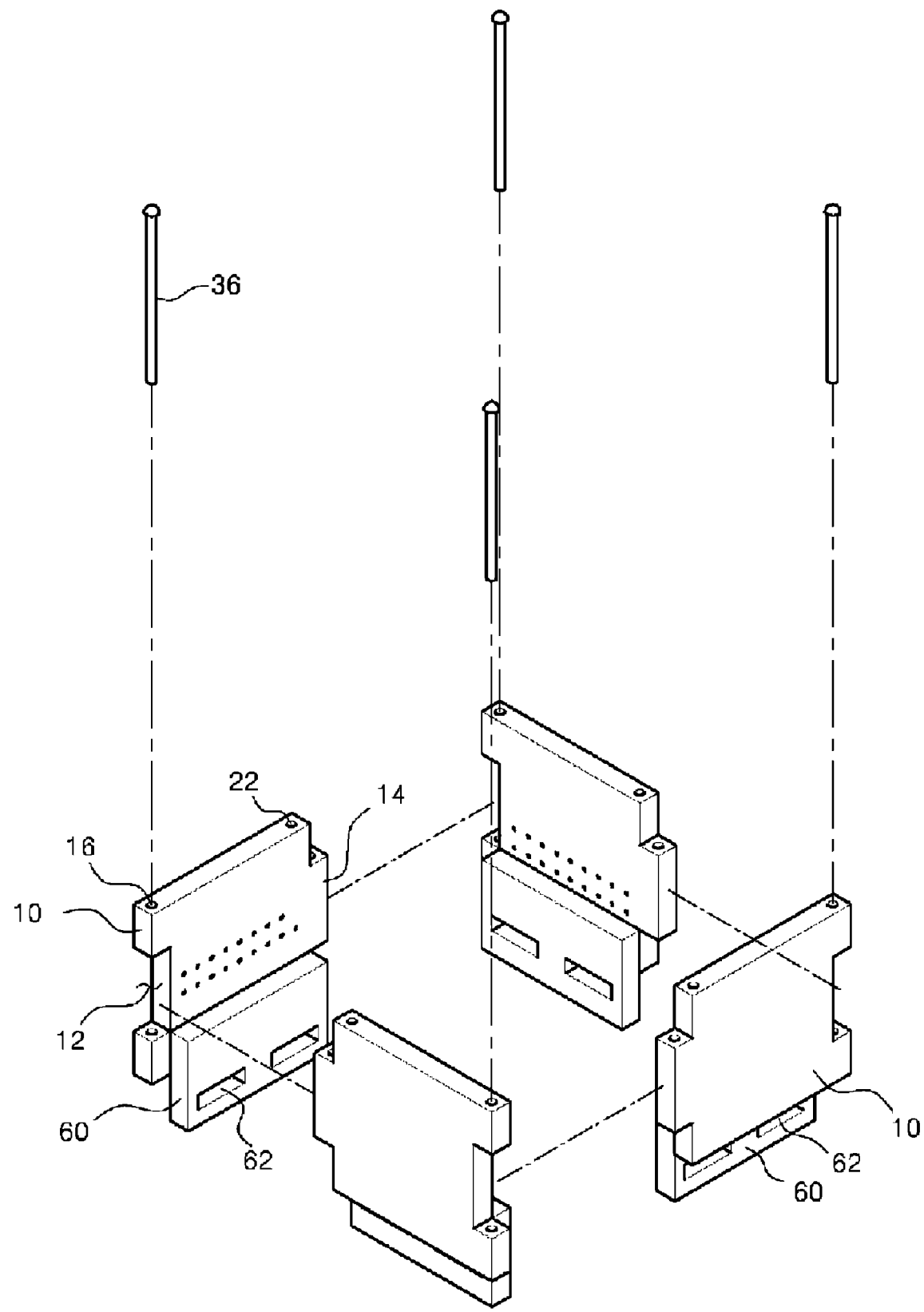
FIG. 10 is an exploded view illustrating the prefabricated type flowerpot block with an auxiliary body provided under and combined with a block body, according to another modified embodiment of the present invention.

In transplanting process as shown in FIG. 9, a tree 50 to be transplanted is stood up, and the prefabricated type flowerpot block is simply assembled to wrap the roots of the tree 50, so that the roots of the tree 50 can remain in soil if the tree 50 is planted in ground soil before the tree 50 is transported to another place. Basically, fourth block bodies 5 are assembled in an insertion joint manner to form one block unit in the form of a frame having four sides or in the form of a cylinder. Accordingly, the section of the block unit has a rectangular shape or a circular shape. The block bodies 10 have basically the same structure, in which each block body has the assembly depression 12 and the assembly protrusion 14 at respective ends so as to be assembled in an insertion joint manner.

Figure 5:
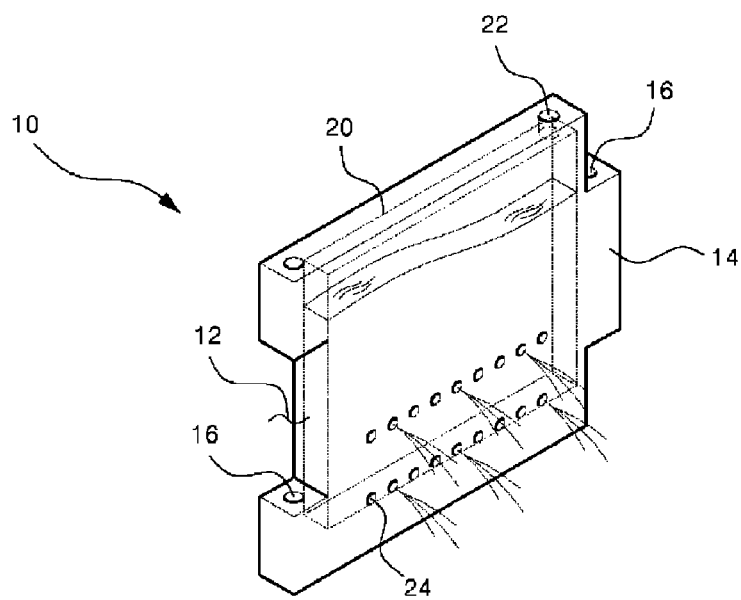
FIG. 5 is a view illustrating the detailed structure of a block body, which is a main part of the prefabricated type flowerpot block according to the present invention.

As described in FIG. 5, a block body of the prefabricated type flowerpot block is a hollow body, so it has a water tank 20 therein at an upper portion thereof, a water supply hole 22 in an upper end portion thereof, so that water can be introduced into the water tank 20, and a plurality of water discharge holes 24 formed in a lower portion thereof at regular intervals so that water stored in the water tank 20 can be gradually supplied to a plant 50 planted in the prefabricated type flowerpot block. As a result, the roots of the plant 50 can grow in a healthy state.

In the case in which a root-balling period is needed to protect roots and help roots grow strong before the plant is transplanted to a final transplanting place, as shown in FIG. 9, according to general transplanting methods, a box-shaped body is assembled to receive the roots of a plant to be transplanted and soil to cover the roots, the plant is moved to the place where the plant is to be transplanted as it is, that is, remaining planted in the box-shaped body, and then the plant is replanted in the transplanting place. However, unlike the general transplanting method, according to the present invention, the prefabricated type flowerpot block is placed on the ground, and water is supplied to a plant through the water supply hole 22 formed in the block body 10. Accordingly, the plant to be transplanted can be conveniently maintained safe during a transplanting period.

Figure 7:
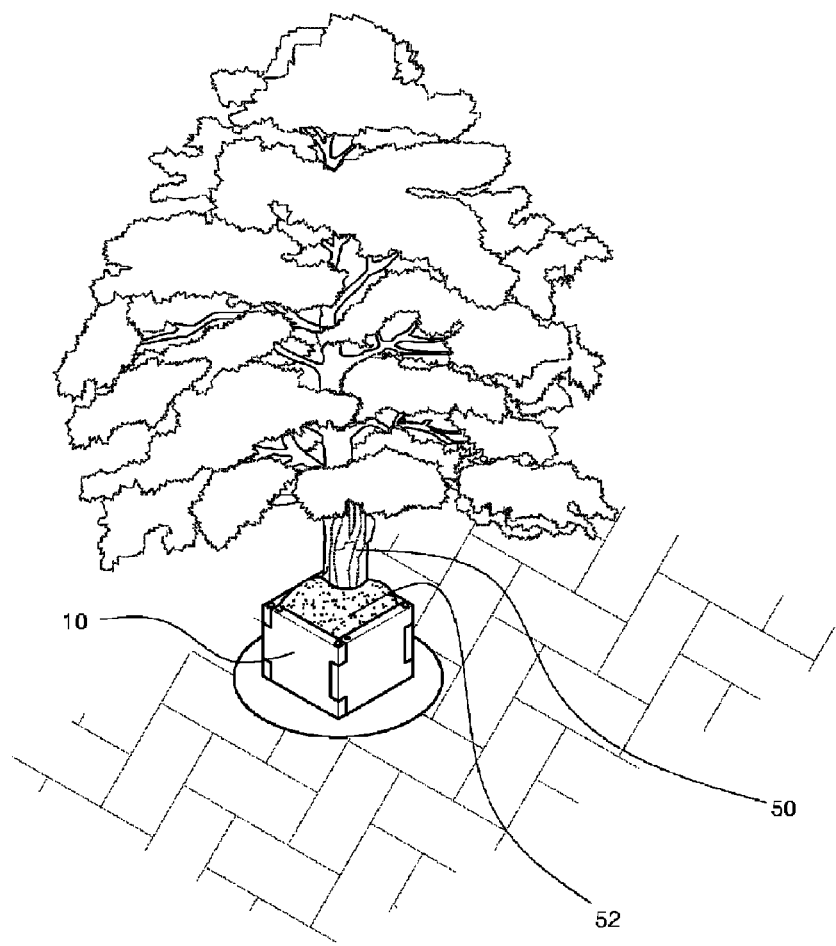
FIG. 7 is a view illustrating the prefabricated type flowerpot block serving as a flowerpot in which a plant is planted in the state of being used.

When the prefabricated type flowerpot block is used, as shown in FIG. 7, in the case of performing root-balling or replanting a plant right after the plant 50 is dug up from a natural area or a predetermined place, replanting can be easily and conveniently performed in a simple manner such that the prefabricated type flowerpot block is simply placed, with no need to plant the plant 50 in soil. The prefabricated type flowerpot block can also function as a normal flowerpot. Further, it is possible to plant the plant 50, provided in the prefabricated type flowerpot block, in ground soil. At this time, the prefabricated type flowerpot block is disassembled. In this case, it can be confirmed that the roots of the plant have been kept safe and have grown in the prefabricated type flowerpot block.

MODE FOR THE INVENTION

Figure 2:
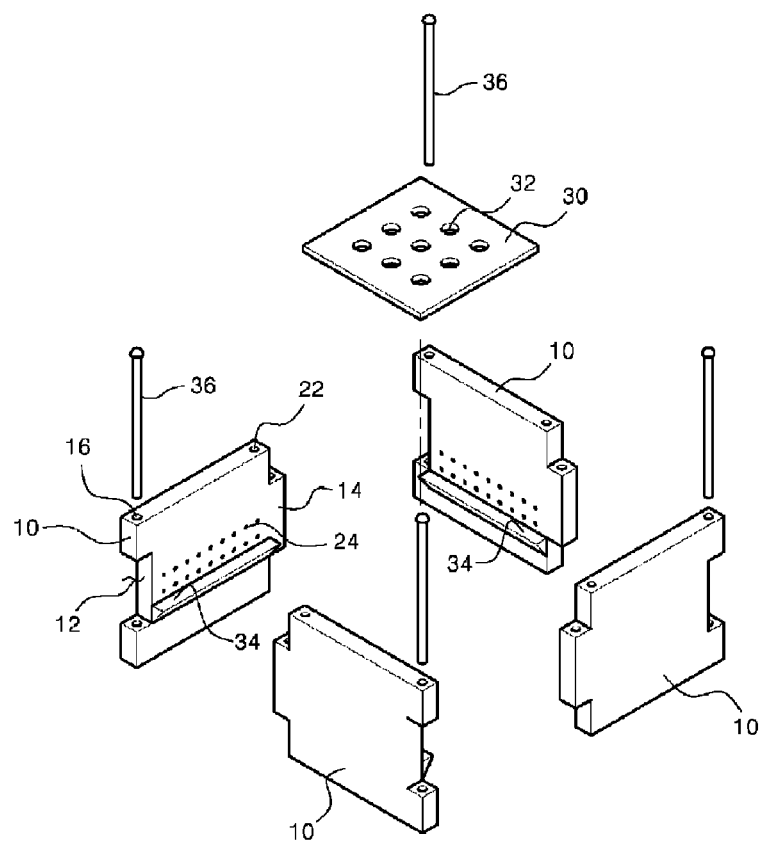
FIG. 2 is a view illustrating a prefabricated type flowerpot block with a base plate, which is in an unassembled state, according to a modified embodiment of the present invention.
Figure 8:
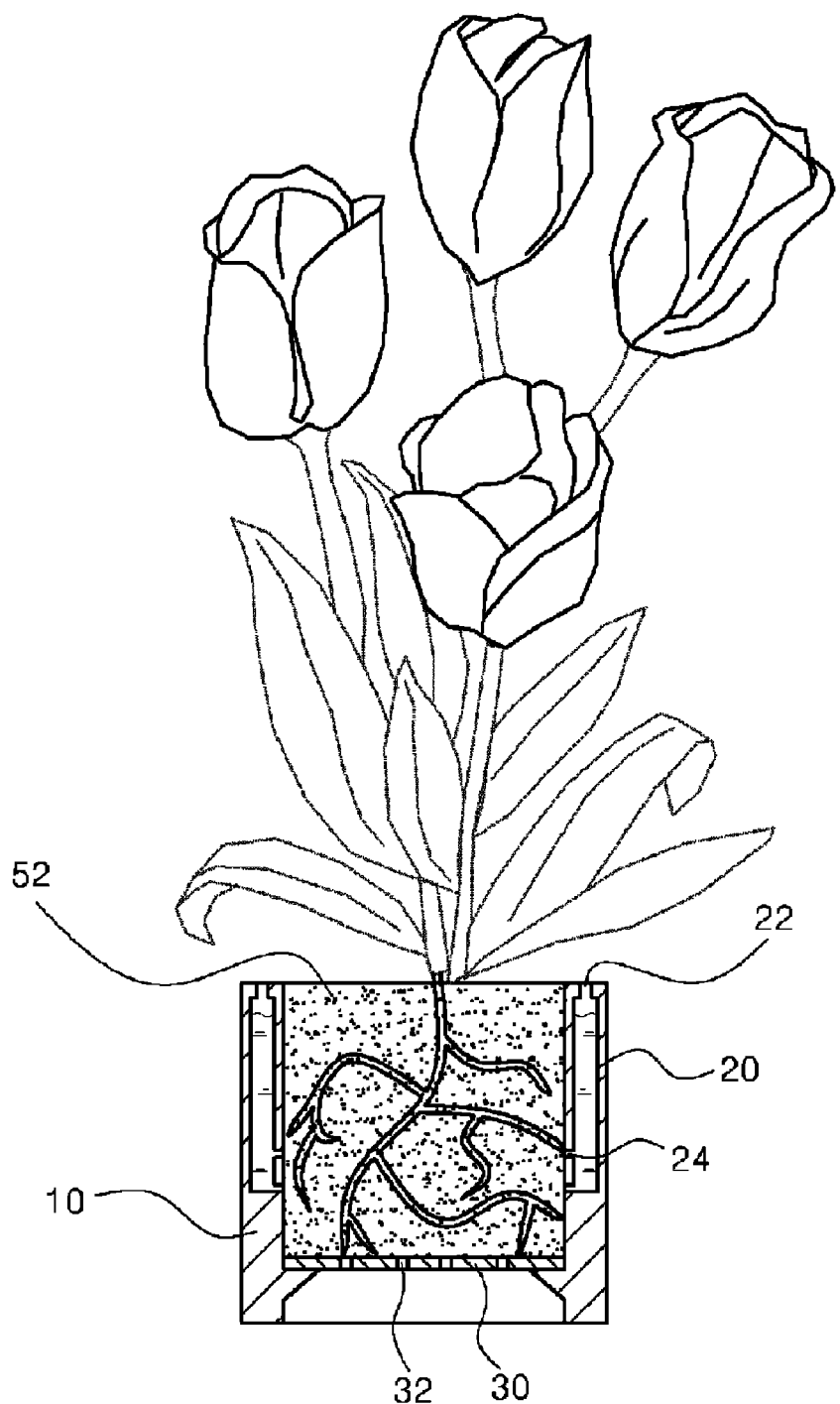
FIG. 8 is a sectional view illustrating the prefabricated type flowerpot block with a base plate and a plant planted therein.

When the prefabricated type flowerpot block is used, as shown in FIG. 8, a base plate 30 is added to the lower end portion of the block body 10 with four sides, so that the prefabricated type flowerpot block can be used as a flowerpot in a simple manner. That is, as shown in FIG. 2, the block body 10 has a support protrusion 34 below the water discharge holes 24, and a base plate 34 having water discharge holes therein is placed on the support protrusion 34 so that the prefabricated type flowerpot block can serve as a flowerpot.

Figure 3:
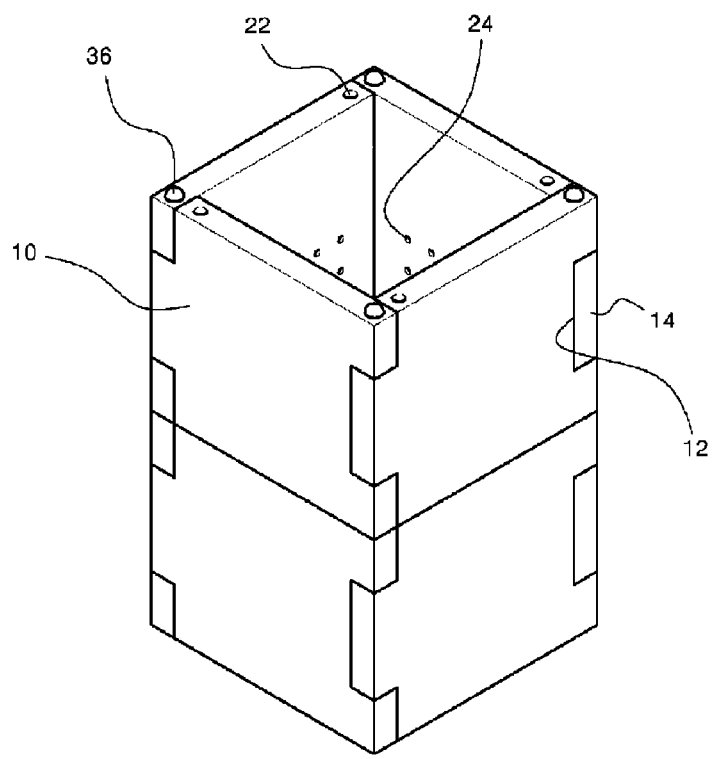
FIG. 3 is a view illustrating a prefabricated type flowerpot block shown in FIG. 1, in which the prefabricated type flowerpot block is in an assembled and stacked state.
Figure 4:
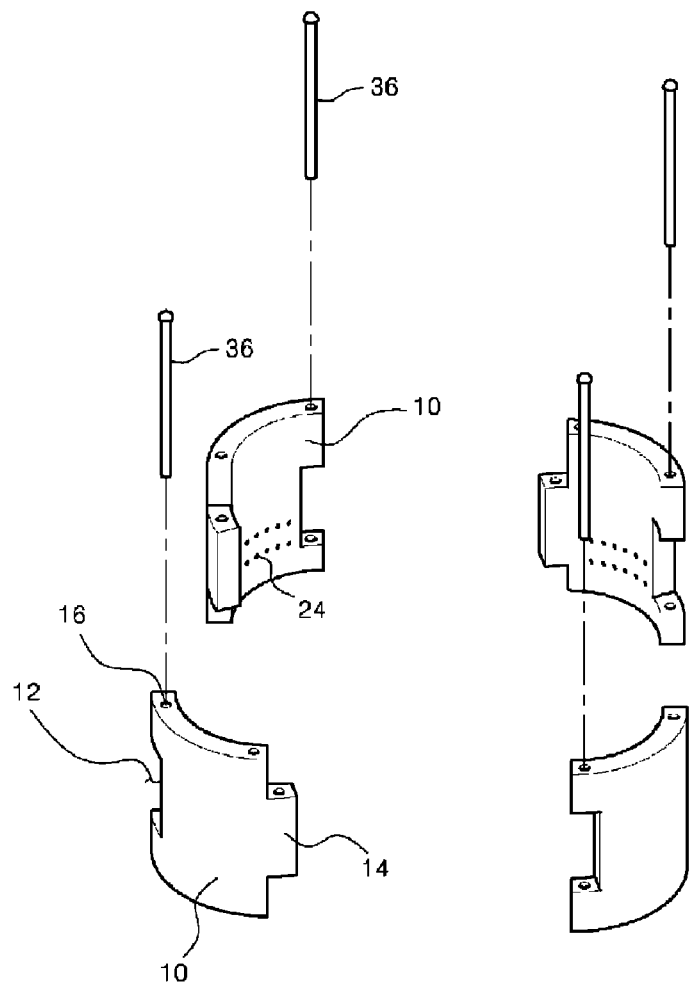
FIG. 4 is a view illustrating a prefabricated type flowerpot block having a curved surface and in an unassembled state, according to another embodiment of the present invention.
Figure 11:
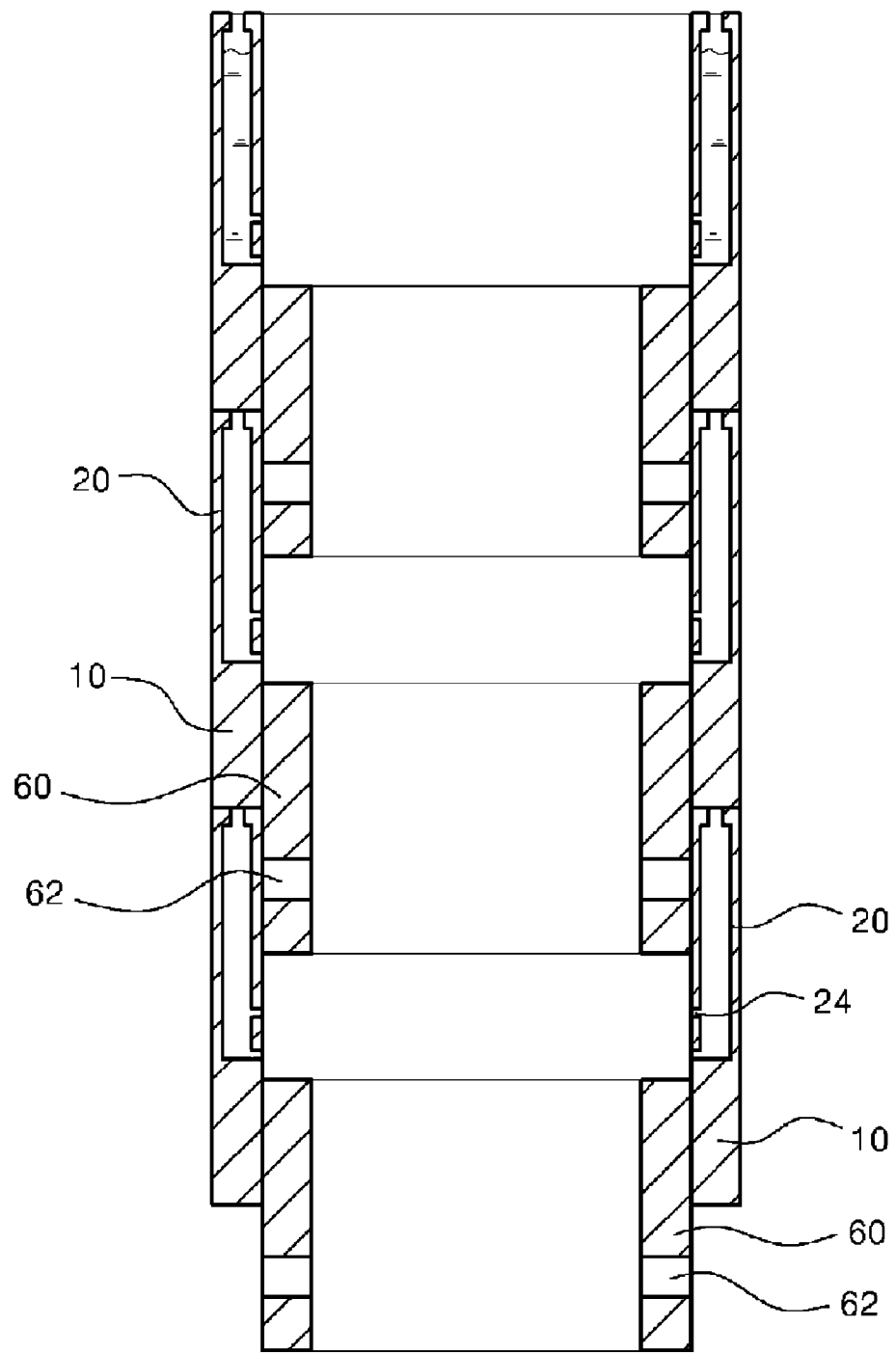
FIG. 11 s a sectional view illustrating the stacked prefabricated type flowerpot blocks shown in FIG. 10.

Further, as shown in FIG. 3 or FIG. 11, a plurality of prefabricated type flowerpot blocks, each block being comprised of four block bodies, can be staked to increase the total height of the prefabricated type flowerpot block in the case in which the plant to be transplanted is very big or has long roots.

Figure 6:
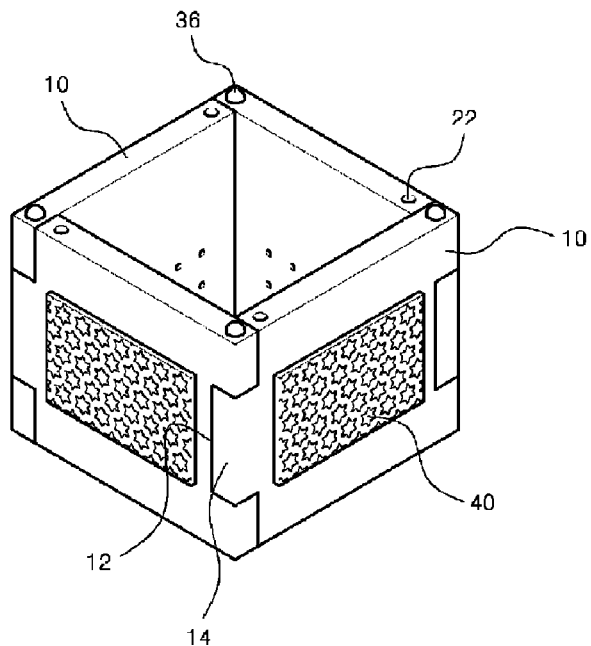
FIG. 6 is a view illustrating the prefabricated type flowerpot block having a pattern plate attached to a block body, in which the prefabricated type flowerpot block is in the state of being used.

Still further, in the case in which a note which describes the characteristics of a plant or specifies the needs of the plant provided in the prefabricated type flowerpot block, as shown in FIG. 6, a pattern plate 40 is attached to the outer surface of the prefabricated type flowerpot block, for example, to the side opposite the surface in which the water discharge holes 24 are formed. In this case, functionality and a decorative effect are improved.

Figure 12:
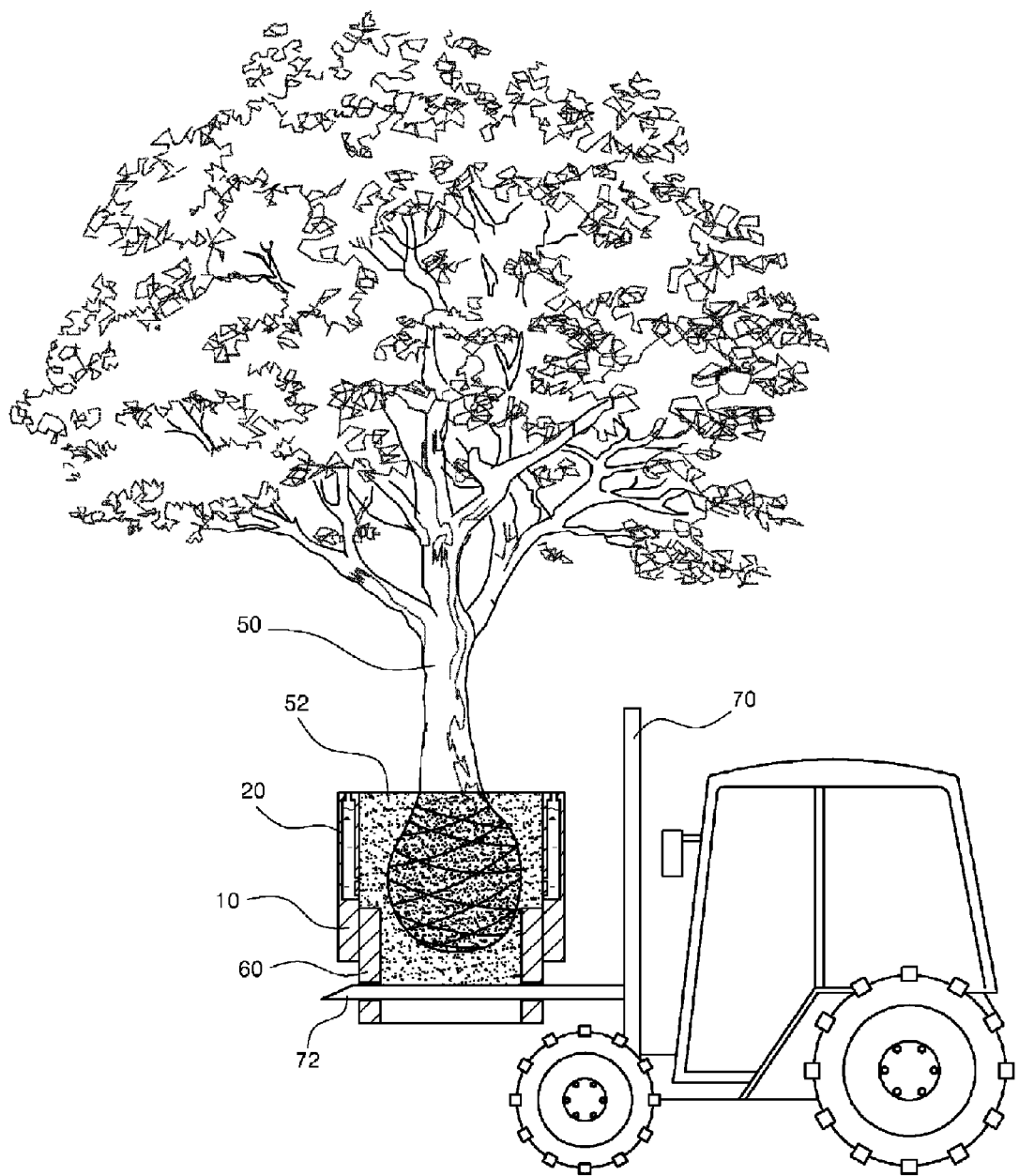
FIG. 12 is a view illustrating an example of the use of the prefabricated type flowerpot block shown in FIG. 10, in which the prefabricated type flowerpot block is moved using a forklift.

As shown in FIG. 12, the prefabricated type flowerpot block includes an auxiliary body 60 which has two insertion holes 62 in respective sides thereof in order to allow the prefabricated type flowerpot block to be easily moved using a forklift truck. The auxiliary body 60 is coupled to a lower portion of the block bodies 10 below the water discharge holes 24. When the prefabricated type flowerpot block is moved, the legs 72 of a forklift truck 70 are inserted through the insertion holes 62 of the auxiliary body 60, so that the prefabricated type flowerpot block with the plant 50 provided therein can be easily and conveniently moved.

Figure 13:
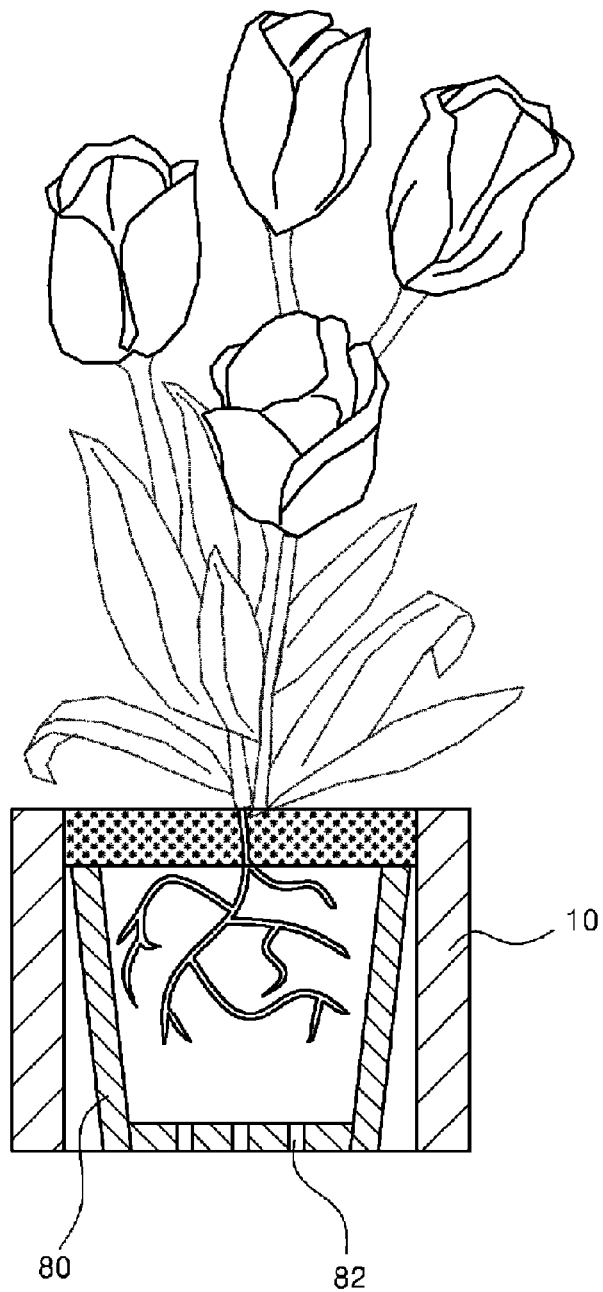
FIG. 13 is a view illustrating another example of the use of the prefabricated type flowerpot block, in which a pot with a tree planted therein is received in the prefabricated type flowerpot block.

As shown in FIG. 13, the prefabricated type flowerpot block can be assembled to surround a flowerpot 80 in which a plant is planted and which is covered with soil or moss. Thanks to this structure, pots can be standardized and the style of the pots can be improved. Unexplained reference numeral 82 denotes a water discharge hole provided in a lower end portion of a conventional flowerpot 80.

Figure 14:
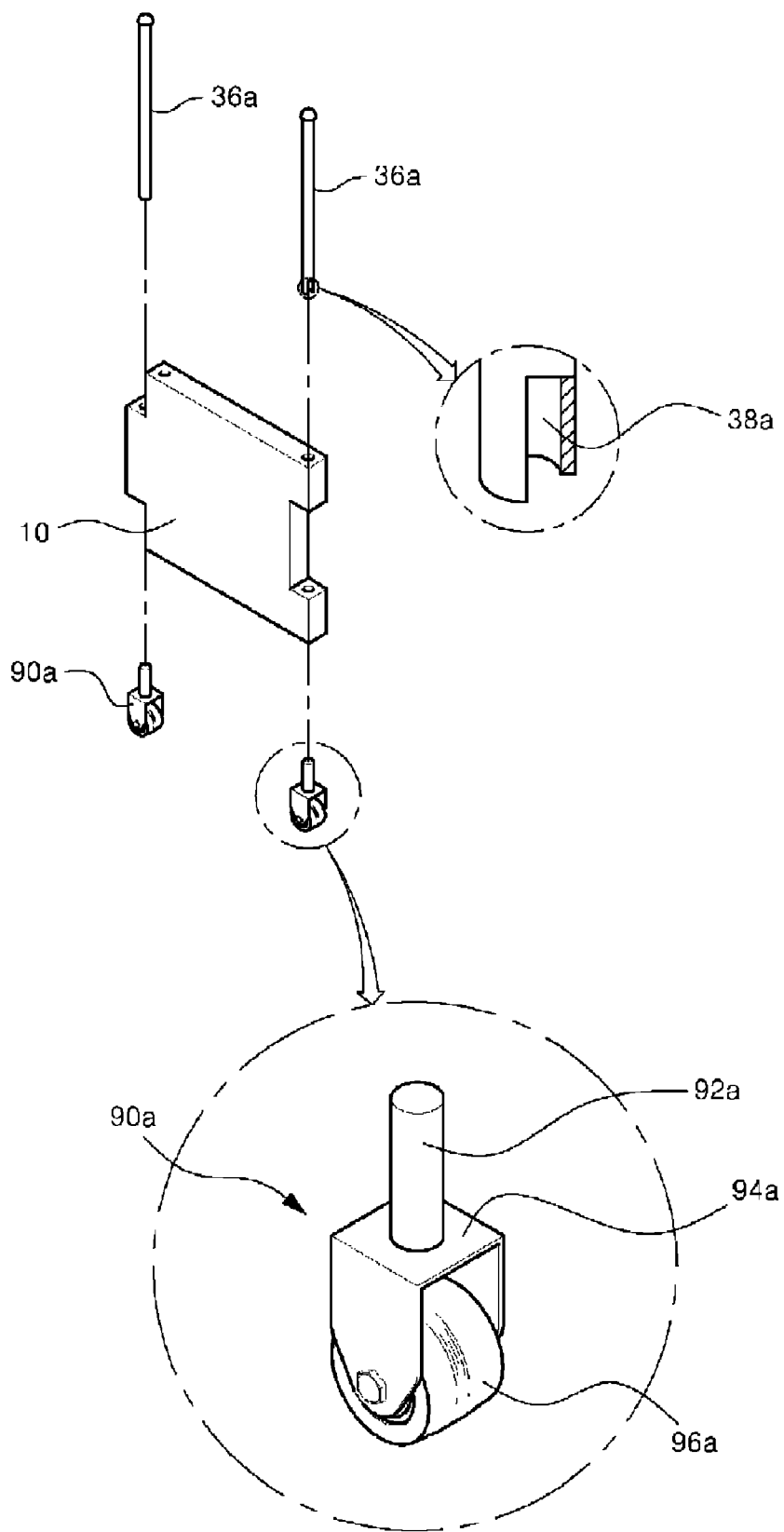
FIG. 14 and FIG. 15 are exploded views illustrating prefabricated type flowerpot blocks according to further modified embodiments of the present invention, in which the prefabricated type flowerpot blocks include a base plate which can rotate and a base plate which can be moved, respectively.

The prefabricated type flowerpot block according to the present invention can be used in a variety of modified forms. For example, as shown in FIG. 14, the prefabricated type flowerpot block may have wheels 96a on the bottom thereof so that it can easily move on the ground. In this case, the fixing unit 36a has a coupling recess 38a which is formed through a cut-out method and is disposed at a lower end portion thereof, unlike the fixing unit 36 provided in the prefabricated type flowerpot block according to the basic embodiment of the present invention. A connection bar 92a is joined with the coupling recess 38a in an insertion jointing manner. The wheel 96a, which is rotatably coupled to a roller bracket 94a, is coupled to the fixing unit 36a via the connection bar 92a as a moving means.

Figure 15:
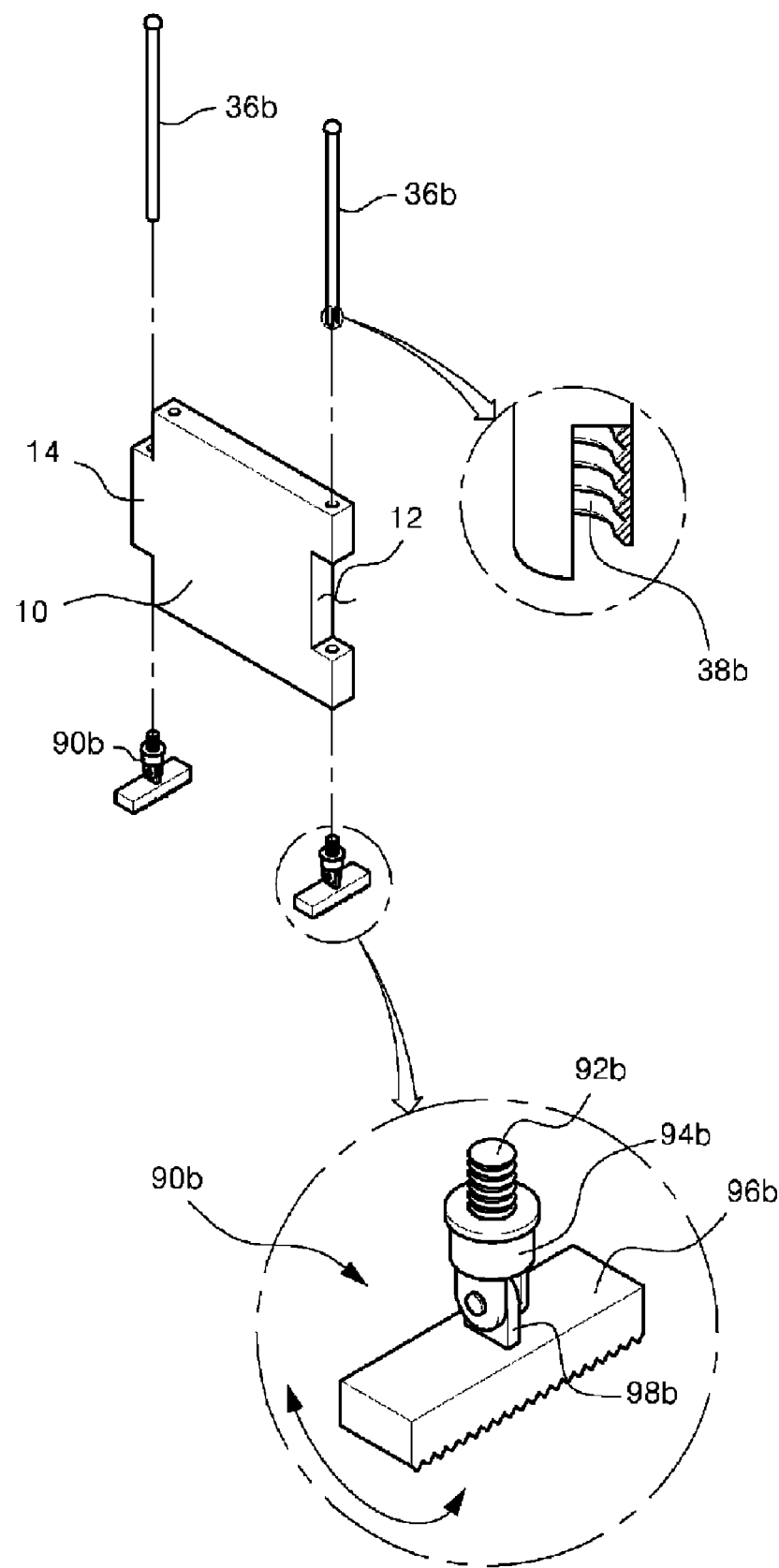

As shown in FIG. 15, the prefabricated type flowerpot block may have support plates 96b the inclination of which can be adjusted and which have a rough pattern in the form of a sawtooth on the bottom thereof, so that the prefabricated type flowerpot block does not slip on an inclined ground surface due to the frictional force.

In order to adjust the inclination degree of the support plates 96b, the support plates 96 have the structure in which a rotating end 98b protruding from a center upper end portion of the support plate 96b is rotatably joined with a center portion of a support body 94b in a hinged manner, a connection bar 92b protruding from the upper surface of the support body 94b has screw threads in an upper portion thereof, and the upper portion of the connection bar 92b is stably coupled to the coupling recess 38b provided in a lower end portion of a fixing unit in screwed manner unlike the fixing unit 36b.

The prefabricated type flowerpot block can be modified to have an advertisement function as well as a plant transplanting function.

Figure 16:
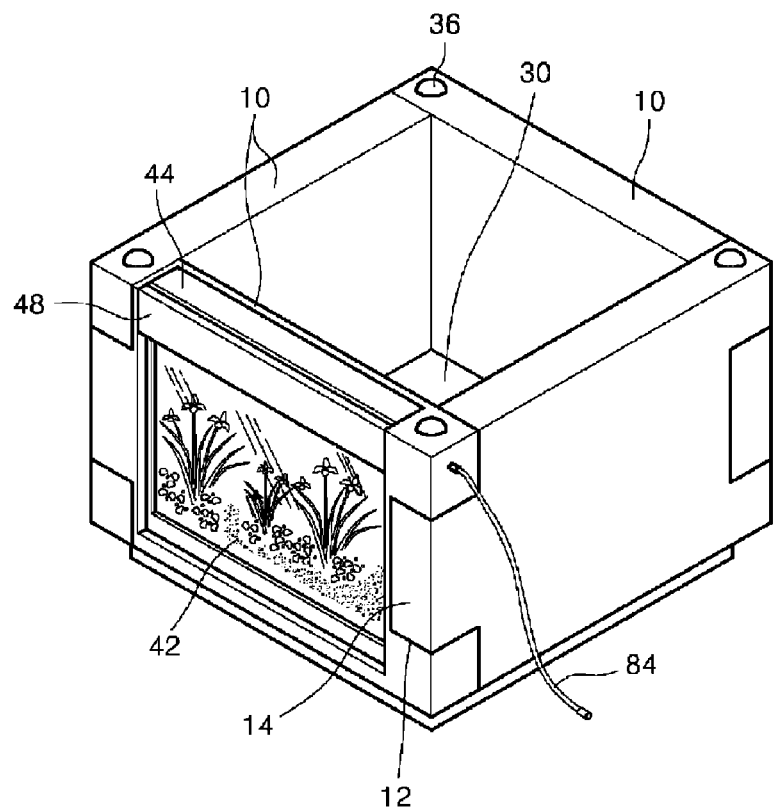
FIG. 16 and FIG. 17 are views illustrating prefabricated type flowerpot blocks according to still further modified embodiments of the present invention, in which one prefabricated type flowerpot block is in an assembled state and has an advertisement function, and the other one is in an unassembled state and has a lighting picture frame.
Figure 17:
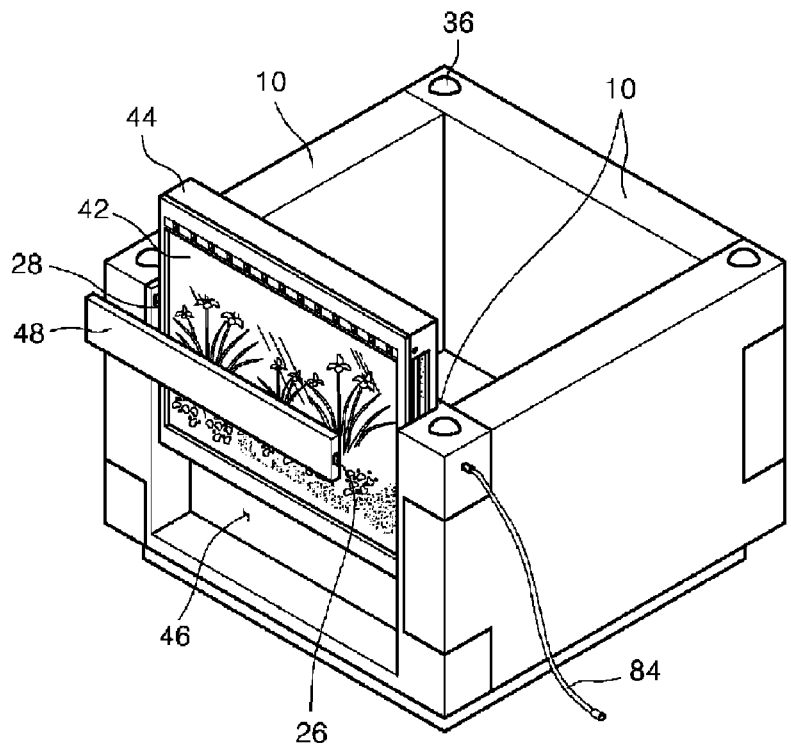

As shown in FIG. 16 and FIG. 17, the prefabricated type flowerpot block basically comprises four block bodies 10, each forming one side of the prefabricated type flowerpot block. The block bodies in a separated state 10 can be assembled to be unitary, and the assembled structure is secured by the fixing unit 36. A base plate 30 is coupled to a lower end portion of the assembled block bodies 10 so that the assembled structure is open at an upper end portion alone. Particularly, one block body 10, serving as the front side of the prefabricated type flowerpot block, has a frame insertion portion 46 to receive a lighting frame 44 therein in order to provide an advertisement function.

That is, the front side block body 10 is closed only at the back portion thereof using a plate having a predetermined thickness and has the frame insertion portion 46 at the front thereof so that a lighting frame 44 can be inserted and disposed in the frame insertion portion 46. In this case, the prefabricated type flowerpot block has a separation prevention bar 48 at an upper and front portion of the front side block body 10, so that the light frame can stay stable in the frame insertion portion and are not separated from the frame insertion portion 46. The separation prevention bar 46 can be coupled to the front side block body 10 in an insertion joint manner. The separation prevention bar can be integrated into the front side block body 10.

Further, although the separation prevention bar 48 can be integrated into the front side block body 10 or can be provided to the front side block body 10 in a separated form, so that the lighting frame 44 can be inserted into the lighting frame insertion portion 46 in a direction from an upper portion, the lighting frame insertion portion 46 can be devised in an alternative manner. That is, the front side block body 10 does not have the separation prevention bar 48, but has a space in which the lighting frame can be placed in the direction from the front of the prefabricated type flowerpot block. The lighting frame can be fixed using an additional fixing unit 46 after the lighting frame is received in the lighting frame insertion space in a direction from the front of the prefabricated type flowerpot block.

Alternatively, the front side block body 10 may have the lighting frame insertion portion 46 whereas the side block bodies and a back side block body are in a simple panel form. The side block bodies and the back side block body are assembled using the assembly protrusion provided at a middle portion of a first edge of each block body and the assembly depression provided in a middle portion of a second edge of each block body in an insertion joint manner, thereby forming a box-shaped flowerpot block with an opening at an upper end thereof. A lower end of the box-shaped flowerpot block is closed by an additional base plate 30.

In the case of the prefabricated type flowerpot block having an advertisement function, the prefabricated type flowerpot block may have a small size base plate so that the four-sided block can be lifted by a predetermined height. This kind of prefabricated type flowerpot block may have a structure in which it can be connected to a power supply cable 84, or it can be equipped with a battery pack so that the lighting frame 44, fixed into the lighting frame insertion portion 46 of the front side block body 10, flashes.

The separation prevention bar 48, coupled to the front side block body 10 and constituting the prefabricated type flowerpot block, is preferably provided in such a manner that it can be joined with the frame insertion portion 46 in a pressing-insertion manner. Alternatively, the separation prevention bar 48 can be detachably attached to the frame insertion portion 46 in a variety of manners.

The lighting frame 40 can adopt a basic system which is commonly used. That is, a circuit board, on which a plurality of light-emitting devices (LED) is mounted, is arranged on one side, a light-guided panel is arranged on the back side, a transparent panel with an advertising object 42 is provided at the front side, and the circuit board, the light-guided panel and the transparent panel are coupled to form a frame shape. However, a variety of advertising means, which can give lighting effects for the advertising object 42 built into the frame, can be used.

Figure 18:
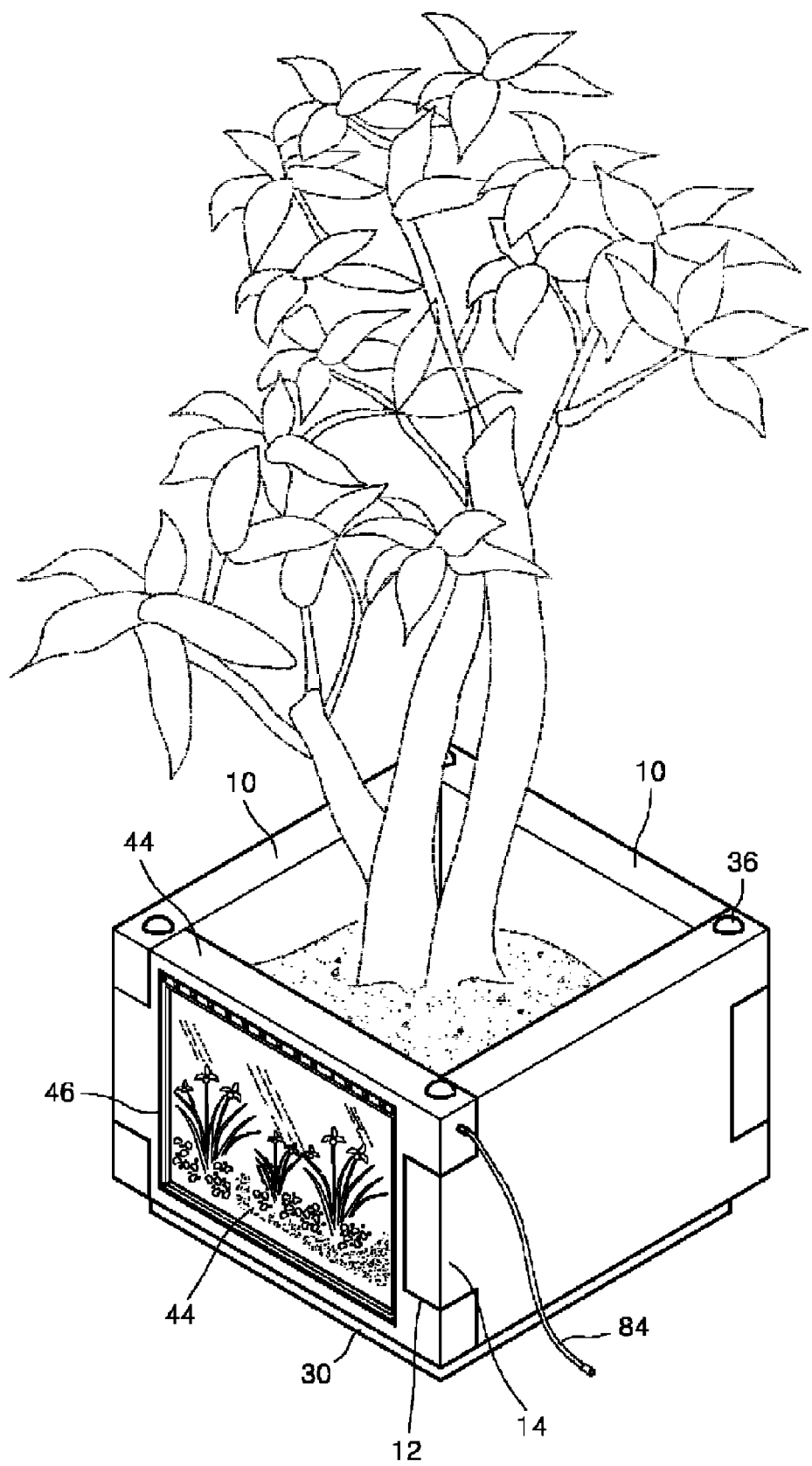
FIG. 18 is a view illustrating the used state of the prefabricated type flowerpot block shown in FIG. 16, in which the prefabricated type flowerpot block has an advertisement function and is used to plant a flower therein.

Further, as shown in FIG. 18, the basic structure of the prefabricated type flowerpot block according to the prevent invention is a pot, formed from block bodies 10a and 10b, to receive a plant therein. However, the prefabricated type flowerpot block according to the present invention can serve as an accessory block to receive accessories or a variety of objects therein, in which case the size of the block bodies 10 is shrunk.

INDUSTRIAL APPLICABILITY

As described above, according to the present invention, there is provided a prefabricated type flowerpot block. It can be assembled in a simple manner, it can perform root-balling for a predetermined period, and it makes it convenient to move the plant. Accordingly, it eliminates the trouble of planting a plant to be transplanted in the ground during a transplanting process, and thus it prevents the roots of a plant from being damaged while the plant is moved to a transplanting site. The prefabricated type flowerpot block can also function as a flowerpot to plant any size of plant therein.

The invention claimed is:

1. A prefabricated type flowerpot block, comprising:
   four block bodies, each having an assembly protrusion at a first end, an assembly depression at a second end which is opposite the first end so that the assembly protrusion of another block body can be inserted into the assembly depression, a water supply hole formed in an upper portion so that water can be introduced into a water tank provided in an upper part thereof, and a plurality of water discharge holes formed in an inner surface thereof; and
   a fixing unit which is inserted into a coupling hole provided in the assembly protrusion and the assembly depression of the block body so that the block bodies are securely coupled after the block bodies are assembled.

2. The prefabricated type flowerpot block according to claim 1, wherein the block body has a support protrusion protruding in a horizontal direction below the water discharge holes, which allows the prefabricated type flowerpot block to function as a flowerpot, and a base plate having a plurality of water discharge holes is placed on the support protrusion.

3. The prefabricated type flowerpot block according to claim 1, wherein the block body has a rectangular panel shape or a curved shape so that they can form a box shape or a cylinder shape, and a pattern plate can be attached on an outer surface thereof, which is opposite the surface in which the water discharge holes are provided.

4. The prefabricated type flowerpot block according to claim 1, wherein the block body has an auxiliary body having insertion holes therein so that forks of a forklift truck can be inserted into the insertion holes when the prefabricated type flowerpot block is moved using a forklift truck, in which the auxiliary body is integrated into the block body.

5. The prefabricated type flowerpot block according to claim 1, wherein the block body has wheels so that the prefabricated type flowerpot block can be moved on the ground, wherein each wheel is rotatably coupled to a roller bracket which is connected to a lower end portion of a fixing unit via a connection bar which is joined with the lower end portion of the fixing unit in an insertion manner.

6. The prefabricated type flowerpot block according to claim 1, wherein the block body has a support plate having roughness in a bottom surface thereof so that an inclination degree of the block body can be adjusted and can be fixed on the ground, wherein a rotating body is provided on a center portion of the support plate, and the rotating body is rotatably connected to a lower end portion of the fixing unit via a connection bar in a threaded manner.

* * * * *